United States Patent
Renko

(10) Patent No.: US 6,470,582 B1
(45) Date of Patent: Oct. 29, 2002

(54) APPARATUS AND METHOD OF DRAWING A LINE PERPENDICULAR TO A REFERENCE LINE

(75) Inventor: Mark L. Renko, Ballwin, MO (US)

(73) Assignee: Rencon, Edwardsville, IL (US)

( * ) Notice: Subject to any disclaimer, the term of this patent is extended or adjusted under 35 U.S.C. 154(b) by 21 days.

(21) Appl. No.: 09/628,882

(22) Filed: Jul. 31, 2000

(51) Int. Cl.7 .................................................. G01C 3/10
(52) U.S. Cl. ............................ 33/494; 33/476; 33/759; 33/1 G
(58) Field of Search ........................ 33/494, 476, 679.1, 33/755, 759, 1 G

(56) References Cited

U.S. PATENT DOCUMENTS

| | | |
|---|---|---|
| 190,447 A | 5/1877 | Putham |
| 627,427 A | 6/1899 | Kirby |
| 2,389,369 A | 11/1945 | Kittleson |
| 3,004,344 A * | 10/1961 | Douglas ........................ 33/494 |
| 3,250,010 A * | 5/1966 | Smith ........................... 33/494 |
| 4,566,198 A * | 1/1986 | Vitale .......................... 33/138 |
| 4,575,943 A * | 3/1986 | Baum, Jr. ..................... 33/138 |
| 5,230,158 A | 7/1993 | Wall |
| 5,251,382 A | 10/1993 | Hellar |
| 5,479,719 A | 1/1996 | Liu |
| 5,519,943 A | 5/1996 | Snyder |
| 5,638,605 A * | 6/1997 | Sligar ........................... 33/494 |
| 5,771,598 A | 6/1998 | Lassberg |
| D443,215 S * | 6/2001 | Croya et al. .................. D10/72 |

FOREIGN PATENT DOCUMENTS

| | | | |
|---|---|---|---|
| GB | 0002213 | * of 1889 | ................. 33/755 |
| GB | 0023273 | * of 1894 | ................. 33/755 |
| JP | 08029103 A | * 2/1996 | |

* cited by examiner

Primary Examiner—Diego Gutierrez
Assistant Examiner—Lydia M. De Jesús
(74) Attorney, Agent, or Firm—Thompson Coburn LLP

(57) ABSTRACT

A measure to use to draw a line perpendicular to a reference line. The measure comprises a top surface with opposite first and second ends and opposite first and second edges that extend between the first and second ends. The top surface has a first set of indicia that represent a first scale and a second set of indicia that represent a second scale. The first and second scales are distance scales and have a common zero point. The second scale is a multiple of the first scale. The first and second scales are used to construct the two sides and the hypotenuse of a right triangle with one of the two sides being on the reference line so that a line perpendicular to the reference line can be constructed with little or no calculations required by the user.

6 Claims, 4 Drawing Sheets

APPARATUS AND METHOD OF DRAWING A LINE PERPENDICULAR TO A REFERENCE LINE

BACKGROUND OF THE INVENTION (i) Field of the Invention

The present invention relates in general to measuring devices, and particularly to a measuring device designed to be used in drawing a line perpendicular to a reference line. More particularly, the invention relates to measuring devices that utilize multiple scales that are related by the Pythagorean theorem to facilitate the drawing of a line perpendicular to a reference line from a point on the reference line.

(ii) Description of the Related Art

In the construction of buildings, houses, and the like, it is often necessary to make a line that is perpendicular to an existing wall, structure or reference line. For example, this need typically arises when the building specifications specify a wall to bebuilt perpendicular to another wall. In this situation, the reference line may be a marking on the floor or a wall that has already been framed and the desired perpendicular line is going to be used to mark the location to build the perpendicular wall.

To construct the perpendicular line, builders have employed numerous techniques over the years. The simplest technique involves the use of a square. The builder places a first edge of the square along the reference line and then draws a perpendicular line by making a mark along a second edge of the square. The use of a square, however, is limited by its physical dimensions and can not be utilized to accurately draw a line perpendicular to a reference line that is longer in length than the square. Attempts to extend the length of the drawn perpendicular line introduce error and the extended line usually deviates from perpendicular as the line is extended. The use of a square, therefore, is not a viable option in situations where the perpendicular line needs to be longer than 1–3 feet.

Other prior art techniques employ the use of the Pythagorean theorem. Typically, a builder will utilize the well know and easily remembered relationship of a 3-4-5 right triangle. That is, a triangle with a first side 3 units in length (a unit being a dimensional measure of any linear scale, i.e. feet, meters, etc.), a second side 4 units in length and a hypotenuse 5 units in length will always be a right triangle with the first and second sides perpendicular to each other. Therefore, if either the first or second side runs along the reference line, the second or first side, respectively, will extend perpendicular to the reference line and can be used to mark a perpendicular line. Typically, a builder will mark a reference point on the reference line from which a perpendicular line is to be drawn. The builder will then scribe a first arc 3 units in radius from the reference point through an area generally believed to be perpendicular to the reference line from the reference point. The builder would then mark a second reference point on the reference line that is 4 units in length from the first reference point. Next, the builder would scribe a second arc 5 units in radius from the second reference point through the first arc. The first and second arcs intersecting at a third reference point. Finally, the builder would draw a line from the third reference point to the first reference point. The line connecting the first and third reference points would then be perpendicular to the reference line from the first reference point. The builder, if desired, can also use multiples of the 3-4-5 triangle if desired. For example, the builder can use a 6-8-10 triangle (a multiple of 2) in the same manner as the 3-4-5 triangle to draw a perpendicular line. The 3-4-5 triangle is popular because it is easy to remember and does not involve any calculations.

While this method has been used for a long time, there are inherent drawbacks to the use of the 3-4-5 triangle. In order to ensure the best accuracy in drawing the perpendicular line, it is desirable to make the two arcs intersect at a distance away from the reference wall that is longer than the perpendicular line needs to be drawn. However, the 3-4-5 triangle method is limited to lengths of 3 or 4 units away from the reference line or multiples thereof. In theory, any multiple of the 3-4-5 triangle could be employed to achieve the best accuracy, however, there are practical limitations to using multiples of the 3-4-5 triangle. If the demands of the specifications require a perpendicular line to be drawn that exceeds the 3 or 4 units in length then the builder will need to use multiples of the 3-4-5 triangle. Certainly, a competent builder can calculate a 2×multiple of the 3-4-5 triangle and perhaps even higher whole multiples. However, the whole multiples get large quickly and the lengths of the sides of the triangle may exceed the physical space limitations within which the builder can work. Therefore, it is very likely that a fractional multiple of the 3-4-5 triangle will need to be employed, to balance the physical space limitations against the desire to ensure the best accuracy. When a fractional multiple of the 3-4-5 triangle needs to be employed, the simplicity and ease of use is no longer present and a builder must resort to detailed calculations making the use of the 3-4-5 triangle not viable.

Another method of constructing perpendicular lines currently used by builders is the use of a preprogrammed calculator. Preprogrammed calculators are available that incorporate the use of the Pythagorean theorem to determine the lengths to utilize when constructing a right triangle to draw a perpendicular line. These preprogrammed calculators attempt to make the inputting of the available dimensions and the application of the results simple for the builder. However, there are many places in which an error can be introduced. For example, the builder must measure and then enter the available dimensions into the preprogrammed calculator. This introduces a potential for the incorrect measurement of the available space or the possibility of entering the information into the preprogrammed calculator incorrectly. The builder must also take the output of the preprogrammed calculator and use it to construct the right triangle, again introducing the potential for error. Additionally, the cost of the preprogrammed calculator is high and their durability is limited.

Finally, the builder can resort to using the Pythagorean theorem and a calculator to determine the dimensions of a right triangle to use to construct a line perpendicular to the reference line. However, this method introduces even more chances for error, is more complicated, and more time consuming than the use of the preprogrammed calculator because the builder must understand the Pythagorean theorem and how to utilize it to construct the desired right triangle. Therefore, the use of a calculator and the Pythagorean theorem is not a practical way of drawing a line perpendicular to a reference line.

Therefore, what is need is a simple apparatus and method to draw a line perpendicular to a reference line that is durable and easy to use. The apparatus and method should require little or no calculation by the builder and be inexpensive. Additionally, the apparatus and method should provide the most accurate perpendicular line possible while utilizing the maximum amount of space available for the builder to work in.

SUMMARY OF THE INVENTION

The present invention overcomes shortcomings of prior art devices by providing a measure that utilizes two scales and the Pythagorean theorem to allow a builder to quickly and easily draw a line perpendicular to a reference line. Furthermore, the present invention allows the builder to accurately draw a line perpendicular to a reference line with little or no calculations.

The present invention comprises both a method of determining perpendicular lines and an apparatus for determining perpendicular lines. The apparatus is comprised of a measure with a top surface having opposite first and second ends and opposite first and second edges. The first and second edges extend between the first and second ends. The top surface has a first set of indicia adjacent the first edge that represents a first scale. The top surface also has a second set of indicia adjacent the second edge that represents a second scale. The first and second sets of indicia have a common zero point. The second scale is a multiple of 1.4142 of the first scale.

In the preferred embodiment, the first scale is a true distance scale with the indicia setting forth the feet, inches, and fractions thereof in the well known conventional manner using lines of varying length and numbers to indicate the distance from the zero point. Alternatively, the first scale can have indicia that sets forth the true distance in meters, centimeters, and fractions thereof in the same manner. Preferably, the zero point is located at the first end. The measure can be a ruler, a folding ruler, a tape measure, or any other similar device. However, the measure is preferably a tape measure.

In another embodiment, the measure can have a bottom surface opposite the top surface. The bottom surface having a third set of indicia adjacent an edge which represents a third scale having a zero point. The bottom surface can also have a fourth set of indicia which represents a fourth scale having a zero point and is adjacent an edge opposite the third set of indicia. The fourth scale sharing the same zero point as the third scale.

The method of drawing a line perpendicular to a reference line using the preferred embodiment comprises marking a first reference point on the reference line from which it is desired to draw a line perpendicular to the reference line. Then selecting a reference distance to utilize in making the line perpendicular to the reference line and scribing a first arc the reference distance in radius as indicated on the first scale from the first reference point through an area generally believed to include a line perpendicular to the reference line from the first reference point. Next, a second reference point is marked on the reference line the reference distance in length as indicated on the first scale from the first reference point. Then a second arc is scribed the reference distance in radius as indicated on the second scale from the second reference point through the first arc with the first and second arcs intersecting at a third reference point. Finally, a line perpendicular to the reference line is drawn by drawing a line from the first reference point to the third reference point.

The builder utilizing this method and apparatus is not required to do any calculations. Additionally, the builder can choose any reference length to employ in using the method and can thereby take advantage of the maximum space available for drawing the line perpendicular to the reference line without sacrificing the accuracy of the line to be drawn. The measure of the invention provides a durable and inexpensive tool to utilize in drawing a line perpendicular to a reference line.

In an alternate embodiment, the apparatus comprises a measure with a top surface having opposite first and second ends and opposite first and second edges. The first and second edges extend between the first and second ends. The top surface has a first set of indicia adjacent the first edge that represents a first scale. The top surface also has a second set of indicia adjacent the second edge that represents a second scale. The first and second sets of indicia have a common zero point. The second scale is a multiple of 1.732 of the first scale.

The method of drawing a line perpendicular to a reference line using the alternate embodiment comprises marking a first reference point on the reference line from which it is desired to draw a line perpendicular to the reference line. Then selecting a reference distance to utilize in making the line perpendicular to the reference line and scribing a first arc the reference distance in radius as indicated on the second scale from the first reference point through an area generally believed to include a line perpendicular to the reference line from the first reference point. Next a second reference point is marked on the reference line the reference distance in length as indicated on the first scale from the first reference point. Then a second arc is scribed two times the reference distance in radius as indicated on the first scale from the second reference point through the first arc with the first and second arcs intersecting at a third reference point. Finally, a line perpendicular to the reference line is drawn by drawing a line from the first reference point to the third reference point.

The builder utilizing this second method and apparatus is not required to do any calculations except for the doubling of the chosen reference length. Additionally, the builder can choose any reference length to employ in using the method and can thereby take advantage of the maximum space available for drawing the line perpendicular to the reference line without sacrificing the accuracy of the line to be drawn. The measure of this alternate embodiment of the invention also provides a durable and inexpensive tool to utilize in drawing a line perpendicular to a reference line.

BRIEF DESCRIPTION OF THE DRAWINGS

Further objectives and features of the present invention are set forth in the following detailed description of the preferred embodiment of the invention and in the drawing figures wherein.

DETAILED DESCRIPTION OF THE INVENTION

Figure 1A:
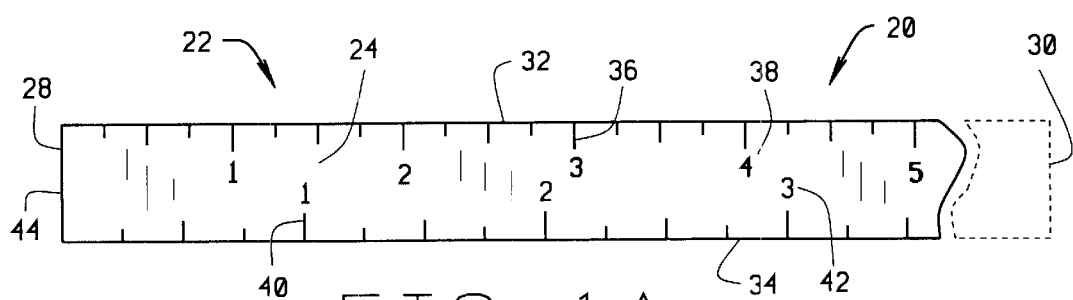
FIG. 1A is a top plan view of a portion of the measure of the present invention employing two scales with one scale being a multiple of 1.4142 of the other scale.
Figure 1B:
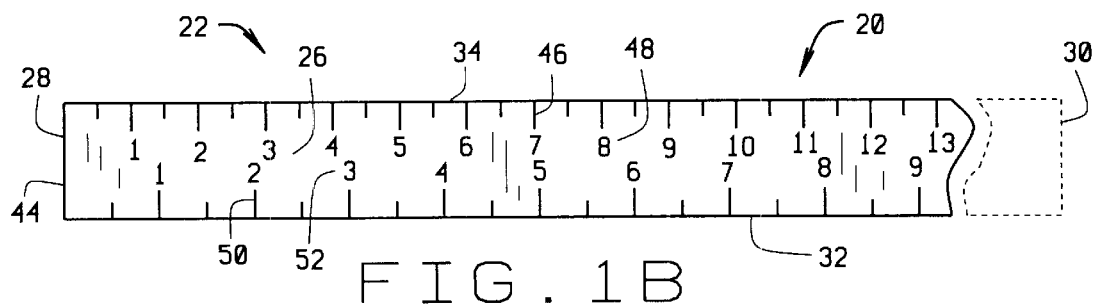
FIG. 1B is a bottom plan view of a portion of the measure of FIG. 1A employing two scales with one scale being a multiple of 1.4142 of the other scale.

FIGS. 1A–B show the measure 20 of the present invention in the form of a portion of a ruler 22. The measure 20 has opposite top and bottom surfaces 24, 26, opposite first and second ends 28, 30 and opposite first and second edges 32, 34. The measure first and second edges 32, 34 extend between the measure first and second ends 28, 30. The top surface 24 has a first set of indicia 36 that represents a first scale 38. The first set of indicia 36 is adjacent the first edge 32 of the measure 20. The measure top surface 24 also has a second set of indicia 40 that represents a second scale 42. The second set of indicia 40 is adjacent the second edge 34 of the measure 20. The first and second set of indicia 36, 40 have a common zero point 44. The second scale 42 is a multiple of 1.4142 of the first scale 38.

In the preferred embodiment, the first scale 38 is a true distance scale. In FIG. 1A, the first scale 38 is a length scale in English units of measure and the first set of indicia 36 depicts the first scale 38 in inches and fractional portions thereof in the manner customary in the industry with the zero point 44 being located at the measure first end 28. The second scale 42 is a false scale which is a multiple of the first scale 38. Because the second scale 42 is a multiple of 1.4142 of the first scale 38, which is a true distance scale, the second set of indicia 40 indicates a length of 1 inches at a distance that is really 1.4142 inches in length, a length of 2 inches at a distance that is really 2.8284 inches in length, etc. While the first scale 38 is preferably a true distance scale, it should be understood that the first scale 38 could be a false distance scale without departing from the scope of the invention. The key feature of the invention being that the second scale 42 is a multiple of 1.4142 of the first scale 38.

In another aspect of the preferred embodiment, the measure 20 has a bottom surface 26 which has a third set of indicia 46 that represents a third scale 48. The third set of indicia 46 being adjacent one of the measure side edges 32, 34. The measure bottom surface 26 also has a fourth set of indicia 50 that represents a fourth scale 52. The fourth set of indicia 50 is adjacent the measure side edge 32, 34 opposite the third set of indicia 46. The third and fourth sets of indicia 46, 50 have a common zero point 44. The fourth scale 52 is a multiple of the third scale 48.

In FIG. 1B, the third set of indicia 46 is adjacent the second edge 34 and the third scale 48 is a true distance scale in metric units of measure. The third set of indicia 46 depicts the third scale 48 in centimeters and fractional portions thereof in the manner customary in the industry and has a zero point 44 at the measure first end 28. The fourth scale 52 is a false scale and is shown as being a multiple of 1.4142 of the third scale 48 and having the same zero point 44 as the third scale 48. Therefore, because the fourth scale 52 is a multiple of 1.4142 of the third scale 48, which is a true distance scale, the fourth set of indicia 50 indicates a length of 1 centimeter at a distance that is really 1.4142 centimeters in length, a length of 2 centimeters at a distance that is really 2.8284 centimeters in length, etc. Additionally, the third scale 48 does not need to be a true length scale to be within the scope of the invention.

Figure 4:
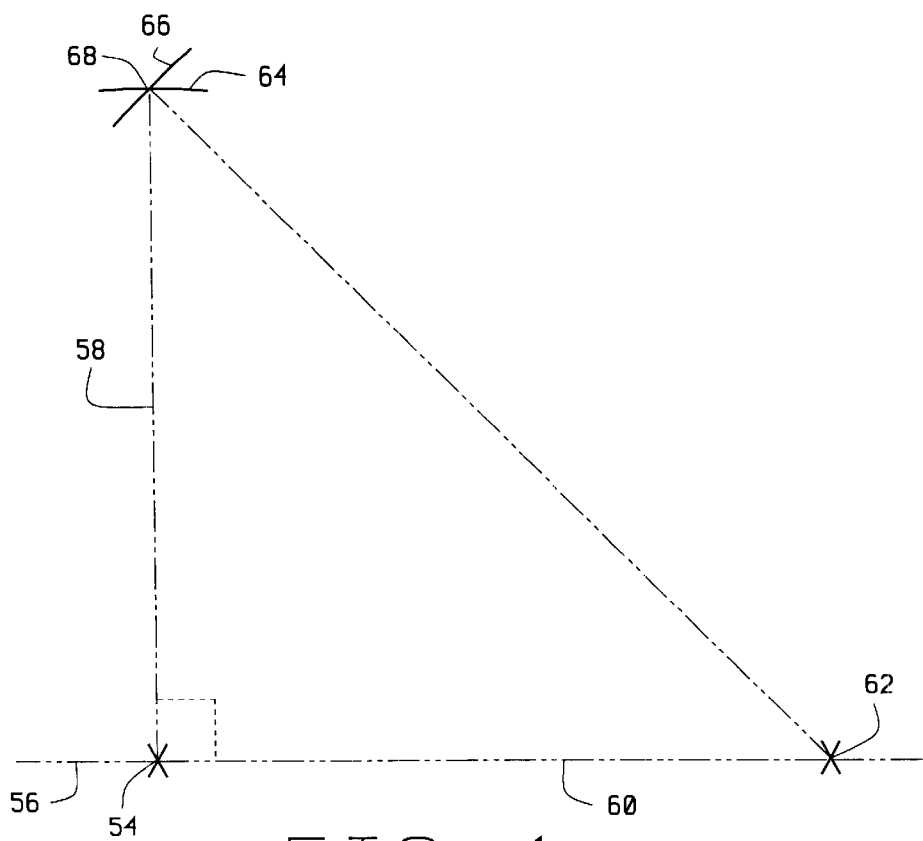
FIG. 4 is a plan view illustrating the method of drawing a line perpendicular to a reference line using any of the measures of FIGS. 1–3.

The method of using the preferred embodiment of the invention, as can be seen in FIG. 4, involves marking a first reference point 54 on a reference line 56 from which it is desired to draw a line 58 perpendicular to the reference line 56. The user would next select a reference distance 60 to utilize in making the perpendicular line 58. In order to ensure the best accuracy, when selecting the reference distance 60, the user would preferably chose a reference distance 60 that is as long as possible but is within the confines of the space within which the user has to work. To accomplish the selection of a longest possible reference distance 60, the user would determine a first maximum distance, using the first scale 38 of the measure 20, that is available for marking a second reference point 62 along the reference line 56 from the first reference point 54 without encountering any obstructions. Next, the user would determine a second maximum distance, again using the first scale 38 of the measure 20, that is available for marking a reference point from the first reference point 54 to an area generally believed to include the line 58 perpendicular to the reference line 56 without encountering any obstructions. The user would then select the smaller of the first and second maximum distances as the reference distance 60.

The next step in the method is for the user to scribe a first arc 64 the reference distance 60 in radius, as indicated on the first scale 38 of the measure 20, from the first reference point 54 through an area generally believed to include the line 58 perpendicular to the reference line 56. The user would then mark a second reference point 62 on the reference line 56 the reference distance 60 in length, as indicated on the first scale 38 of the measure 20, from the first reference point 54. Next, the user would scribe a second arc 66 the reference distance 60 in radius, as indicated on the second scale 42 of the measure 20, from the second reference point 62 through the first arc 64. The first and second arcs 64, 66 intersecting at a third reference point 68. Finally, the user would draw the perpendicular line 58 by connecting the first and third reference points 54, 68.

In an alternate embodiment, the measure 20' is identical to the first embodiment in that the measure 20' is comprised of opposite top and bottom surfaces 24', 26', opposite first and second ends 28', 30' and opposite first and second edges 32', 34' that extend between the first and second ends 28', 30'. The top surface has a first set of indicia 36' that represents a first scale 38'. The first set of indicia 36' is adjacent the first edge 32' of the measure 20'. The measure top surface 24' also has a second set of indicia 40' that represents a second scale 42'. The second set of indicia 40' is adjacent the second edge 34' of the measure 20'. The first and second set of indicia 36', 40' have a common zero point 44'. However, in this alternate embodiment, the second scale 42' is a multiple of 1.732 of the first scale 38'.

Figure 5A:
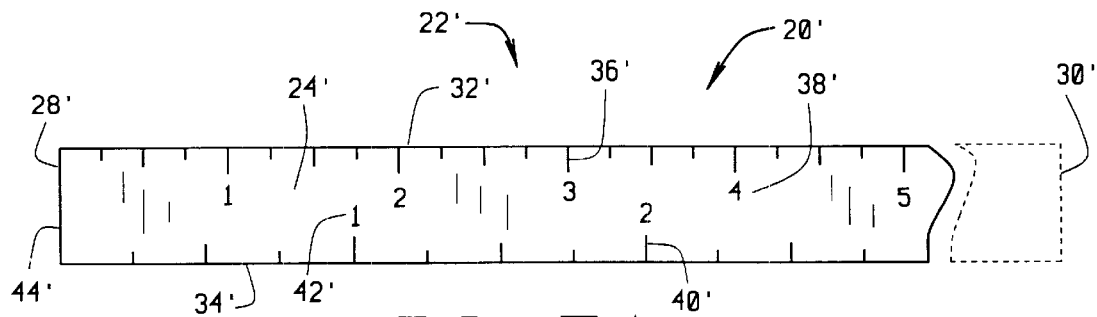
FIG. 5A is a top plan view of a portion of the measure of the present invention employing two scales with one scale being a multiple of 1.732 of the other scale.

Preferably, in the alternate embodiment, the first scale 38' is a true distance scale. In FIG. 5A, the first scale 38' is a length scale in English units of measure and the first set of indicia 36' depicts the first scale 38' in inches and fractional portions thereof in the manner customary in the industry with the zero point 44' being located at the measure first end 28'. The second scale 42' is a false scale which is a multiple of the first scale 38'. Because the second scale 42' is a multiple of 1.732 of the first scale 38', which is a true distance scale, the second set of indicia 40' indicates a length of 1 inches at a distance that is really 1.732 inches in length, a length of 2 inches at a distance that is really 3.464 inches in length, etc. While the first scale 38' is preferably a true distance scale, it should be understood that the first scale 38' could be a false distance scale without departing from the scope of the invention. The key feature of the alternative embodiment of the invention being that the second scale 42' is a multiple of 1.732 of the first scale 38'.

In another aspect of the alternate embodiment, the measure 20' has a bottom surface 26' which has a third set of indicia 46' that represents a third scale 48'. The third set of indicia being adjacent one of the measure side edges 32', 34'. The measure bottom surface 26' also has a fourth set of indicia 50' that represents a fourth scale 52'. The fourth set of indicia 50' is adjacent the measure side edge 32', 34' opposite the third set of indicia 46'. The third and fourth sets of indicia 46', 50' have a common zero point 44'. The fourth scale 52' is a multiple of the third scale 48'.

Figure 5B:
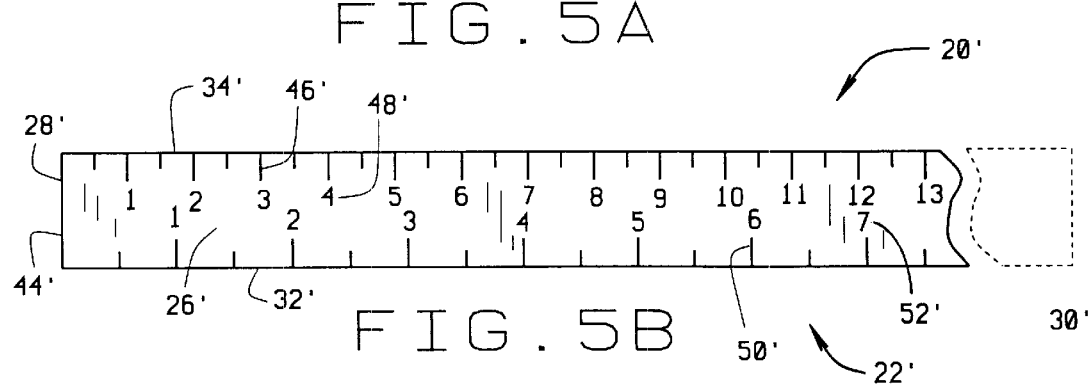
FIG. 5B is a bottom plan view of a portion of the measure of FIG. 5A employing two scales with one scale being a multiple of 1.732 of the other scale.

In FIG. 5B, the third set of indicia 46' is adjacent the second edge 34' and the third scale 48' is a true distance scale in metric units of measure. The third set of indicia 46' depicts the third scale 48' in centimeters and fractional portions thereof in the manner customary in the industry and has a zero point 44' at the measure first end 28'. The fourth scale 52' is a false scale and is shown as being a multiple of 1.732 of the third scale 48' and having the same zero point 44' as the third scale 48'. Therefore, because the fourth scale 52' is a multiple of 1.732 of the third scale 48', which is a true length scale, the fourth set of indicia 50' indicates a length of 1 centimeter at a distance that is really 1.732 centimeters in length, a length of 2 centimeters at a distance that is really 3.464 centimeters in length, etc. Additionally, the third scale 48' does not need to be a true distance scale to be within the scope of the invention.

Figure 6:
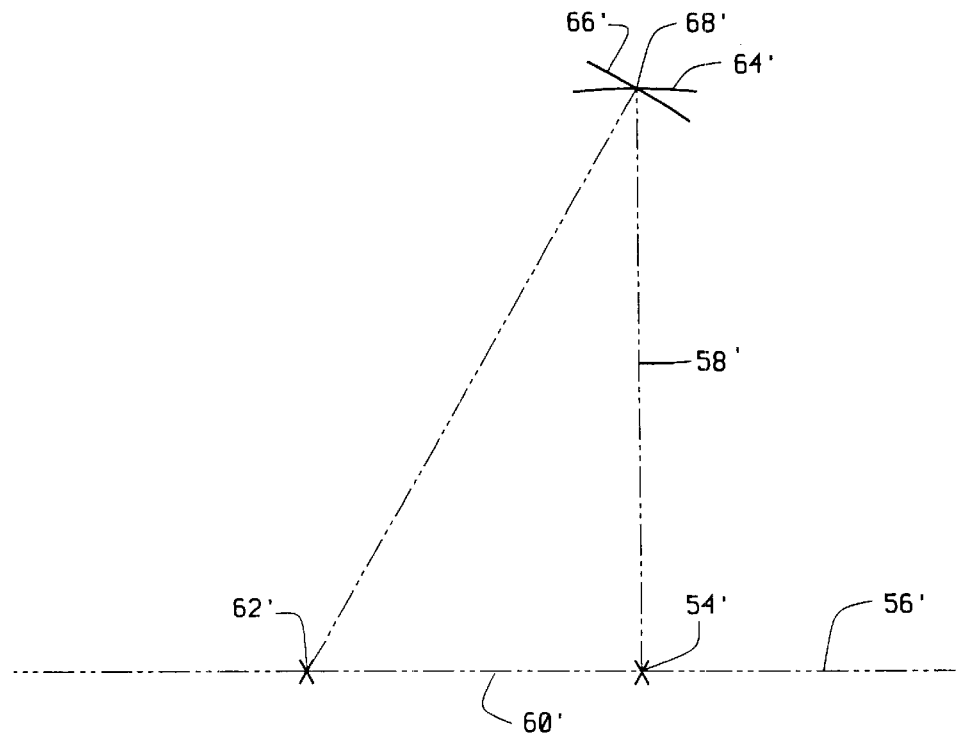
FIG. 6 is a plan view illustrating the method of drawing a line perpendicular to a reference line using either of the measures of FIGS. 5A–B.

The method of using the alternate embodiment is different from the method of using the preferred embodiment, as can be seen in FIG. 6. The method of using the measure 20' of the alternate embodiment involves marking a first reference point 54' on a reference line 56' from which it is desired to draw a line 58' perpendicular to the reference line 56'. The user would next select a reference distance 60' to utilize in making the perpendicular line 58'. In order to ensure the best accuracy, when selecting the reference distance 60', the user would preferably chose a reference distance 60' that is as long as possible but is within the confines of the space within which the user has to work. To accomplish the selection of a longest possible reference distance 60', the user would determine a first maximum distance, using the first scale 38' of the measure 20', that is available for marking a second reference point 62' along the reference line 56' from the first reference point 54'. Next, the user would determine a second maximum distance, using the second scale 42' of the measure 20', that is available for marking a reference point from the first reference point 54' to an area generally believed to include the line 58' perpendicular to the reference line 56'. The user would then select the smaller of the first and second maximum distances as the reference distance 60'.

The next step in the method is for the user to scribe a first arc 64' the reference distance 60' in radius, as indicated on the second scale 42' of the measure 20', from the first reference point 54' through an area generally believed to include the line 58' perpendicular to the reference line 56'. The user would then mark a second reference point 62' on the reference line 56' the reference distance 60' in length, as indicated on the first scale 38' of the measure 20', from the first reference point 54'. Next, the user would scribe a second arc 66' two times the reference distance 60' in radius, as indicated on the first scale 38' of the measure 20', from the second reference point 62' through the first arc 64'. The first and second arcs 64', 66' intersecting at a third reference point 68'. Finally, the user would draw the perpendicular line 58' by connecting the first and third reference points 54', 68'.

Figure 2:
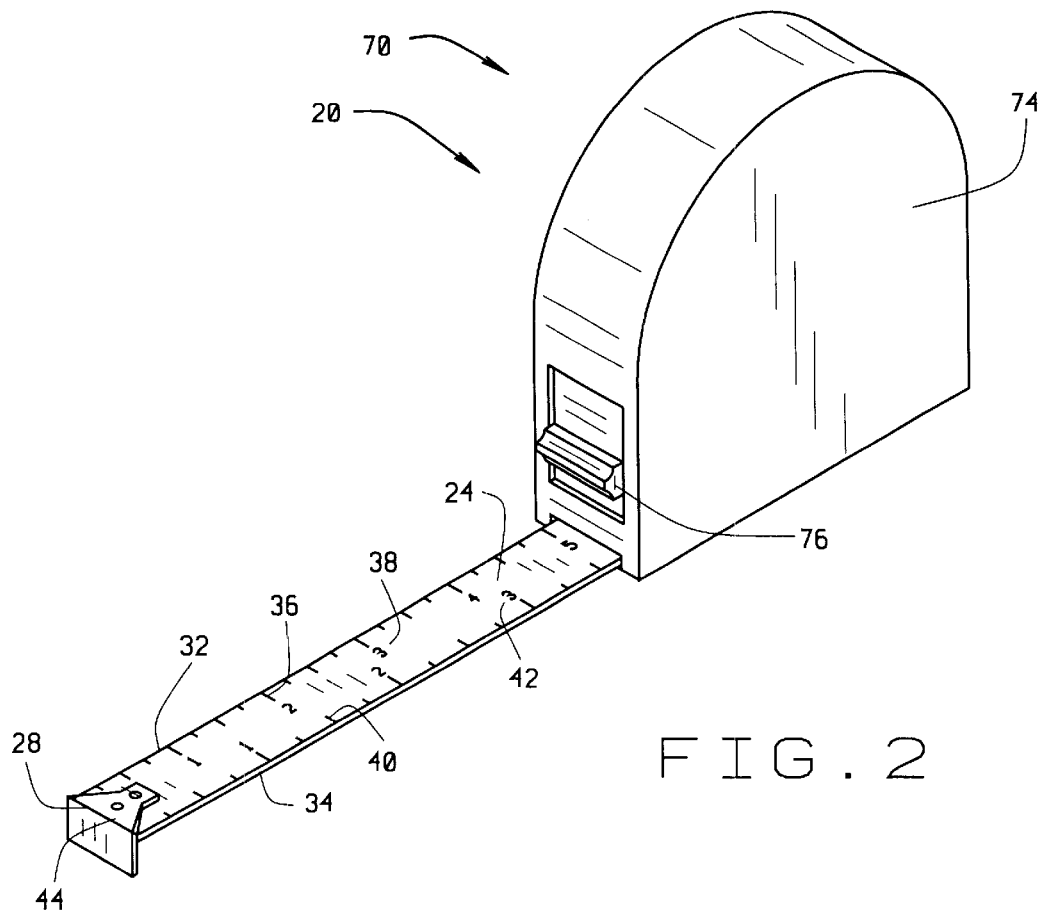
FIG. 2 is a perspective view of a tape measure incorporating the measure of FIG. 1A.
Figure 3:
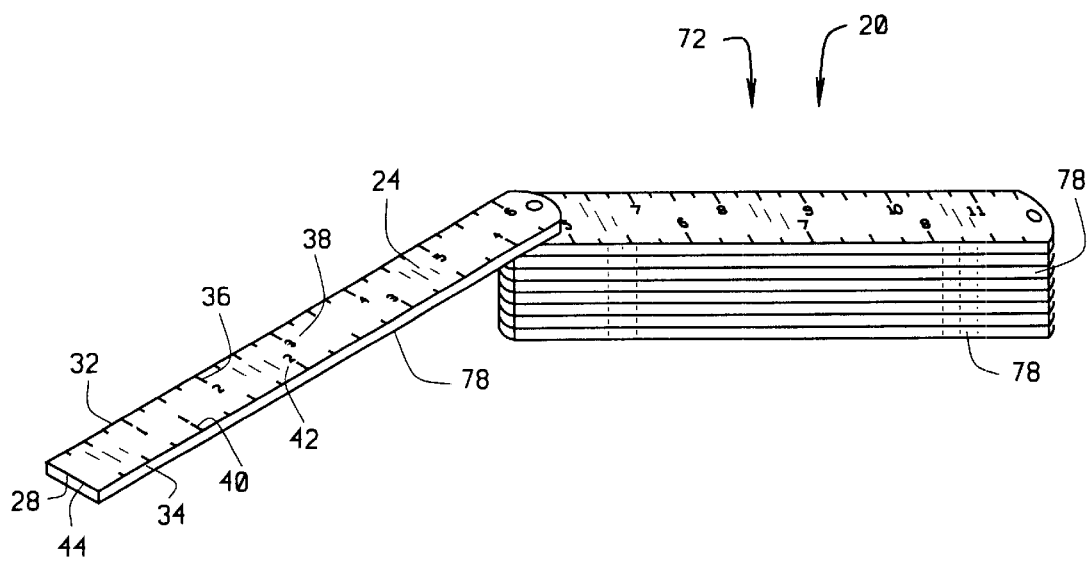
FIG. 3 is a perspective view of a folding ruler incorporating the measure of FIG. 1A.

The measures 20 of FIGS. 2 and 3, for simplicity, are depicted as using the first and second scales 38, 42 of the preferred embodiment. However, FIGS. 2 and 3 could have depicted the alternate embodiment and used the measure 20' and the associated first and second scales 38', 42'.

While the measures 20, 20' have been described as being rulers 22, 22' it is to be understood that the measures 20, 20' are not limited to being rulers 22, 22' and the measures 20, 20' could be in any form used to convey relative or absolute distances without departing from the scope of the invention. For example, FIGS. 2 and 3, depict the measure 20 as a tape measure 70 and as a folding ruler 72, respectively. Additionally, it should be understood that any physical embodiment that is suitable for either measure 20, 20' is suitable for the other measure 20, 20'.

The tape measure 70 is of the type commonly available and well known in the art. The tape measure 70 is comprised of a housing 74 into which the measure 20 is stored. The measure 20 is selectively extendable out of and retractable into the housing 74. The retraction of the measure 20 into the housing 74 is typically assisted by a spring (not shown) inside the housing 74 that coils the measure 20 inside the housing 74 as the measure 20 is being retracted. The tape measure 70 also includes a locking mechanism 76 that selectively locks the measure 20 in place when the measure 20 is extended and prevents the measure 20 from being retracted into the housing 74 or extended from the housing 74 while locked.

The folding ruler 72 is comprised of a plurality of segments 78 that fold on top of one another. The segments 78 are connected to one another in the typical manner as is well known in the art.

The measures 20, 20' can be made out of wood, metal, tape, cloth, or any other material capable of having indicia thereon. The measures 20, 20' can not, however, be made out of a material that stretches or distorts in length when being used as a measure. Preferably, the indicia 36, 36', 40, 40', 46, 46', 50, 50' should be accurate to within ¹⁄₁₆' or its equivalent when using a non-English scale, as is common in the industry. However, the indicia tolerance is not a limitation of the invention.

When describing the methods of using the measures 20, 20', a reference line 56 was used from which to draw a line 58 perpendicular. It should be understood that the use of the term reference line is not meant to limit the method of using the measures 20, 20' to drawing a line perpendicular to a reference line. The term reference line should be interpreted as representative of any thing from which it is desired to draw a line perpendicular.

The methods of using the measures 20, 20' were described for drawing a line perpendicular to a reference line. However, the measures 20, 20' and their methods of use go beyond just drawing a line perpendicular to a reference line. For example, the measures 20, 20' and the associated methods can also be used to draw a line parallel to the reference line by drawing a first line perpendicular to the reference line and then repeating the procedure to draw a second line perpendicular to the first line. The second line will then be parallel to the reference line.

Figure 7:
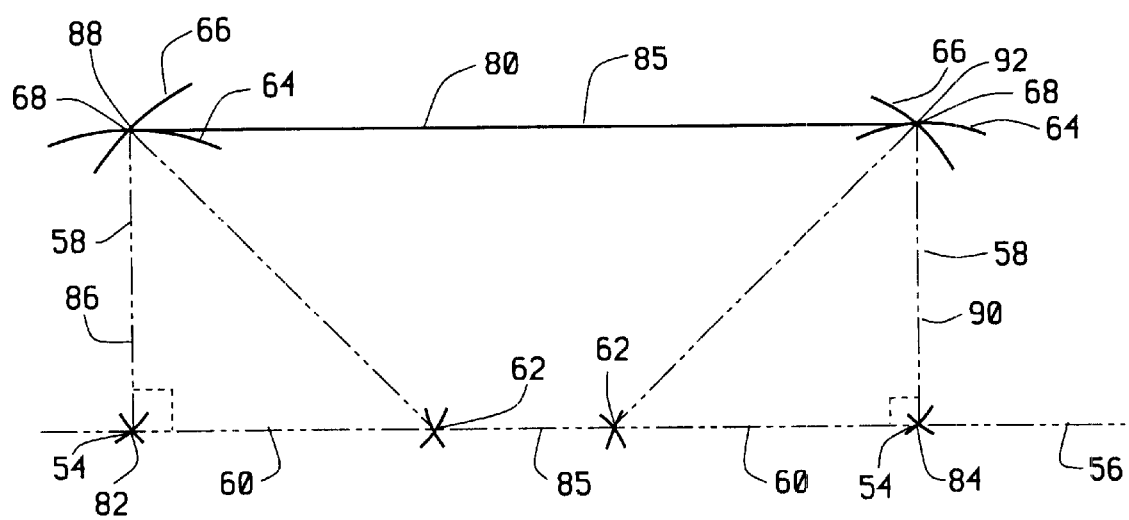
FIG. 7 is a plan view illustrating the use of the method illustrated in FIG. 4 to draw a line parallel to the reference line with a specific length and a specific orientation relative to the reference line.

As another example, the measure 20 and the associated method, as can be seen in FIG. 7, can also be used to draw a line 80 parallel to the reference line 56 that has a desired length and is oriented in a desired location relative to specific points on the reference line 56. Because the method for using the measure 20 was fully explained above, the details of utilizing the method to accomplish this example will only be summarized below. To use the invention to accomplish this example, the user would select a first 82 and second 84 point on the reference line 56 from which the parallel line 80 should run parallel to the reference line 56 and which should be the same distance in length as the distance 85 between the first and second points 82, 84 on the reference line 56. The user would then select as the reference distance 60 the distance which the parallel line 80 is to be spaced from the reference line 56. The user would then use the method, shown in FIG. 4, to draw a first line 86 perpendicular to the reference line 56 the reference distance 60 in length from the first point 82 on the reference line 56. The first line 86 having an ending point 88 at the intersection of the first and second arcs 64, 66. The user would then repeat the method to draw a second line 90 perpendicular to the reference line 56 the reference distance 60 in length from the second point 84 on the reference line 56. The second line 90 having an ending point 92 at the intersection of the first and second arcs 64, 66. The user would then connect the ending points 88, 92 of the first and second perpendicular lines 86, 90 and create the parallel line 80. The parallel line 80 will then have end points 88, 92 that are perpendicular to the reference line 56 from the first and second points 82, 84, respectively, and be the same distance 85 in length as the distance 85 between the first and second points 82, 84.

While the applicant has described his invention with reference to the specific relationships recited between the first and second scales 38, 38', 42, 42' it should be understood that other multiples could be employed by using the Pythagorean theorem. However, applicant has found that the recited multiples create the easiest to use measures 20, 20' and overcome the disadvantages of the prior art.

While the present invention has been described by reference to specific embodiments, it should be understood that modifications and variations of the invention may be constructed without departing from the scope of the invention as defined by the following claims.

What is claimed is:

1. A method of drawing a line perpendicular to a reference line comprising the steps of:
   providing a measure with a first and second scale, the first scale being represented on the measure by a first set of indicia and having a first zero point, the second scale being represented on the measure by a second set of indicia and having a second zero point, the first and second zero points being the same, and the second scale being a multiple of 1.4142 of the first scale;
   marking a first reference point on the reference line from which it is desired to draw a line perpendicular to the reference line;
   selecting a reference distance to utilize in making the line perpendicular to the reference line;
   scribing a first arc the reference distance in radius as indicated on the first scale from the first reference point through an area generally believed to include a line perpendicular to the reference line;
   marking a second reference point on the reference line the reference distance in length as indicated on the first scale from the first reference point;
   scribing a second arc the reference distance in radius as indicated on the second scale from the second reference point through the first arc, the first and second arcs intersecting at a third reference point; and
   drawing a line connecting the first and third reference points.

2. The method of claim 1, wherein the step of selecting a reference distance is further comprised of the steps of:
   determining a first maximum distance using the first scale that is available for marking a reference point along the reference line from the first reference point;
   determining a second maximum distance using the first scale that is available for marking a reference point from the first reference point to an area generally believed to include a line perpendicular to the reference line; and
   selecting a reference distance that is a smaller of the first and second maximum distances.

3. The method of claim 1, wherein the step of providing a measure is further comprised of:
   providing the measure with a third and fourth scale, the third scale being represented on the measure by a third set of indicia and having a third zero point, the fourth scale being represented on the measure by a fourth set of indicia and having a fourth zero point, the third and fourth zero points being the same, and the fourth scale being a multiple of the third scale.

4. A method of drawing a line perpendicular to a reference line comprising the steps of:
   providing a measure with a first and second scale, the first scale being represented on the measure by a first set of indicia and having a first zero point, the second scale being represented on the measure by a second set of indicia and having a second zero point, the first and second zero points being the same, and the second scale being a multiple of 1.732 of the first scale;
   marking a first reference point on the reference line from which it is desired to draw a line perpendicular to the reference line;
   selecting a reference distance to utilize in making the line perpendicular to the reference line;
   scribing a first arc the reference distance in radius as indicated on the second scale from the first reference point through an area generally believed to include a line perpendicular to the reference line;
   marking a second reference point on the reference line the reference distance in length as indicated on the first scale from the first reference point;
   scribing a second arc two times the reference distance in radius as indicated on the first scale from the second reference point through the first arc, the first and second arcs intersecting at a third reference point; and
   drawing a line connecting the first and third reference points.

5. The method of claim 4, wherein the step of selecting a reference distance is further comprised of the steps of:
   determining a first maximum distance that is available using the first scale for marking a reference point along the reference line from the first reference point;
   determining a second maximum distance that is available using the second scale for marking a reference point from the first reference point to an area generally believed to include a line perpendicular to the reference line; and
   selecting a reference distance that is a smaller of the first and second maximum distances.

6. The method of claim 4, wherein the step of providing a measure is further comprised of:
   providing the measure with a third and fourth scale, the third scale being represented on the measure by a third set of indicia and having a third zero point, the fourth scale being represented on the measure by a fourth set of indicia and having a fourth zero point, the third and fourth zero points being the same, and the fourth scale being a multiple of the third scale.

* * * * *